US012629822B2

(12) United States Patent
Kupcsik et al.

(10) Patent No.: US 12,629,822 B2
(45) Date of Patent: May 19, 2026

(54) DEVICE AND METHOD FOR CONTROLLING A ROBOT

(71) Applicant: Robert Bosch GmbH, Stuttgart (DE)

(72) Inventors: Andras Gabor Kupcsik, Boeblingen (DE); Meng Guo, Beijing (CN)

(73) Assignee: ROBERT BOSCH GMBH, Stuttgart (DE)

( * ) Notice: Subject to any disclaimer, the term of this patent is extended or adjusted under 35 U.S.C. 154(b) by 517 days.

(21) Appl. No.: 17/935,879

(22) Filed: Sep. 27, 2022

(65) Prior Publication Data

US 2023/0107993 A1     Apr. 6, 2023

(30) Foreign Application Priority Data

Oct. 5, 2021     (DE) ..................... 10 2021 211 185.8

(51) Int. Cl.
B25J 9/16        (2006.01)
B25J 19/02       (2006.01)
(52) U.S. Cl.
CPC ............... B25J 9/163 (2013.01); B25J 9/161 (2013.01); B25J 9/1697 (2013.01); B25J 19/023 (2013.01)
(58) Field of Classification Search
CPC . B25J 9/163; B25J 9/161; B25J 9/1697; B25J 19/023; G05B 2219/39546; G05B 2219/40116
See application file for complete search history.

(56) References Cited

U.S. PATENT DOCUMENTS

2015/0331415 A1    11/2015  Feniello et al.
2019/0126487 A1*    5/2019  Benaim ..................... B25J 9/163
2020/0276703 A1     9/2020  Chebotar et al.
2021/0170580 A1*    6/2021  Guo ....................... B25J 9/1697
(Continued)

FOREIGN PATENT DOCUMENTS

DE           10355283 A1     6/2004
DE      102008020579 B4     7/2014
(Continued)

OTHER PUBLICATIONS

Pillai, Sudeep, Matthew R. Walter, and Seth Teller. "Learning articulated motions from visual demonstration." arXiv preprint arXiv:1502.01659 (2015).*

*Primary Examiner* — Jason Holloway
*Assistant Examiner* — Blake A Wood
(74) *Attorney, Agent, or Firm* — NORTON ROSE FULBRIGHT US LLP

(57)     ABSTRACT
A method for controlling a robot. The method includes performing demonstrations and descriptor images for the demonstrations from a point of view of the robot of the object; selecting a set of feature points, wherein the feature points are selected by searching an optimum of an objective function which rewards selected feature points being visible in the descriptor images; training a robot control model using the demonstrations and controlling the robot for a control scene with the object by determining a descriptor image of the object, locating the selected set of feature points in the descriptor image of the object; determining Euclidean coordinates of the located feature points; estimating a pose from the determined Euclidean coordinates; and controlling the robot to handle the object by means of the robot control model with the estimated pose.

13 Claims, 3 Drawing Sheets

(56) References Cited

U.S. PATENT DOCUMENTS

| | | | | |
|---|---|---|---|---|
| 2021/0192784 | A1* | 6/2021 | Taylor | B25J 9/1612 |
| 2021/0316449 | A1* | 10/2021 | Wang | B25J 9/1664 |

FOREIGN PATENT DOCUMENTS

| | | | |
|---|---|---|---|
| DE | 102014106210 | A1 | 10/2015 |
| DE | 102020110650 | A1 | 12/2020 |
| DE | 112019001507 | T5 | 12/2020 |
| DE | 102019216229 | A1 | 4/2021 |
| DE | 102020127508 | A1 | 4/2021 |
| DE | 102020128653 | A1 | 5/2021 |

* cited by examiner

300 perform demonstrations
301 provide descriptor image for each demonstration
302 select set of feature points
303 train robot control model
304 control robot determine descriptor image
306 locate selected feature points
307 determine Euclidean coordinates of located
feature points     308 estimate a pose
309 control robot
310

305

US 12,629,822 B2

1

DEVICE AND METHOD FOR CONTROLLING A ROBOT

CROSS REFERENCE

The present application claims the benefit under 35 U.S.C. § 119 of German Patent Application No. DE 10 2021 211 185.8 filed on Oct. 5, 2021, which is expressly incorporated herein by reference in its entirety.

FIELD

The present invention relates to devices and methods for controlling a robot.

BACKGROUND INFORMATION

Robotic skills may be programmed through learning-from-demonstration (LfD) approaches, where a nominal plan of a skill is learned by a robot from demonstrations. The main idea of LfD is to parameterize Gaussians by the pose of a camera monitoring the robot's workspace and a target object to be handled by the robot. For this, and also for usage of the resulting robot control model, estimation of the pose of the object in a given scene needs to be performed. One possibility is RGB-image based pose estimation techniques. However, these may be unreliable.

Approaches are therefore desirable which allow reliable pose estimation in an LfD context.

SUMMARY

According to various embodiments of the present invention, a method for controlling a robot is provided comprising performing demonstrations, wherein each demonstration demonstrates a handling of an object, providing, for each demonstration, at least one descriptor image from a point of view of the robot of the object, wherein the descriptor image specifies feature points for locations on the object, selecting a set of feature points from the specified feature points, wherein the feature points are selected by searching an optimum of an objective function which rewards selected feature points being visible in the descriptor images, training a robot control model using the demonstrations, wherein the robot control model is configured to output control information depending on an input object pose and controlling the robot for a control scene with the object by determining a descriptor image of the object from the point of view of the robot, locating the selected set of feature points in the descriptor image of the object, determining Euclidean coordinates of the located feature points for the control scene, estimating a pose from the determined Euclidean coordinates and controlling the robot to handle the object by means of the robot control model, wherein the estimated pose is supplied to the robot control model as input.

An automatic selection of feature points which are used for pose estimation of an object is thus performed such that the selected feature points are well visible (e.g., in most of the descriptor images). The selection of feature points can thus be seen to be based on the assumption that features that are seen in the demonstrations (e.g. images taken for recording the demonstrations) are good ones in the sense and that they are most of the time seen in scenes where the respective manipulation skill should be performed by the robot.

The point of view of the robot is for example is for example the point of view of a camera attached to the robot, e.g., the point of view of an end-effector of the robot.

Thus, the method described above allows an accurate and reliable pose (e.g. 6D pose) estimation of an object.

In the following, various examples of the present invention are given.

Example 1 is a method for controlling a robot as described above.

Example 2 is the method of Example 1, wherein the objective function further rewards one or more of selected feature points being spaced apart in descriptor space, locations on the object corresponding to the selected feature points being spaced apart in Euclidean space and the detection error for selected features points for the object being low.

These conditions ensure that the feature points can be reliably detected for the object and that, when they have been detected, a pose of the object can be reliably determined.

Example 3 is the method of Example 1 or 2, further comprising matching a plane to the object and selecting the feature points such that they define a coordinate frame on the plane and estimating the pose from the determined Euclidean coordinates of the located feature points and information about the pose of the matched plane.

This ensures a reliable pose estimation even if the object is flat and/or has little variety in a spatial direction (i.e. is not a "real" 3D object).

Example 4 is the method of Example 3, wherein estimating the pose from the determined Euclidean coordinates comprises projecting the Euclidean coordinates of the located feature points to the matched hyperplane.

Thus, a planar coordinate frame (in the plane) can be derived even if the feature points are detected such that their Euclidean coordinates do not lie on the plane.

Example 5 is the method of Example 3 or 4, wherein the plane is matched to the object, the feature points are selected such that they define a coordinate frame on the plane and the pose is estimated from the determined Euclidean coordinates of the located feature points and information about the pose of the plane if a variation of the object in a spatial direction is below a predetermined threshold.

Thus, a reliable pose determination scheme may be trained for both real and non-real 3D objects. In particular, pose detection for real 3D objects is still efficient since (hyper-)plane fitting is only applied if necessary.

Example 6 is the method of any one of Examples 1 to 5, comprising determining a derivation rule of a coordinate frame from Euclidean coordinates of the selected feature points wherein estimating the pose from the determined Euclidean coordinates comprises application of the derivation rule to the selected feature points, wherein the derivation rule is determined by searching a minimum of the dependency of the coordinate frame from noise in the Euclidean coordinates.

This ensures reliable pose detection even in case of detection errors of the feature points.

Example 7 is the method of any one of Examples 1 to 6, wherein training the robot control model using the demonstrations comprises, for each demonstration, locating the selected set of feature points in the descriptor image of the object in the demonstration, determining Euclidean coordinates of the located feature points for the demonstration and estimating a pose from the determined Euclidean coordinates for the demonstration.

This means that the selected feature points can be used for pose estimation for the training of the robot control model itself.

Example 8 is the method of any one of Examples 1 to 7, comprising determining the descriptor image of the object from a camera image of the object by a dense object net.

A Dense Object Net (DON) can be trained to uniquely identify points on an object. Such points can be tracked reliably given different configuration of the object.

Example 9 is a robot controller, configured to perform a method of any one of Examples 1 to 8.

Example 10 is a computer program comprising instructions which, when executed by a computer, makes the computer perform a method according to any one of Examples 1 to 8.

Example 11 is a computer-readable medium comprising instructions which, when executed by a computer, makes the computer perform a method according to any one of Examples 1 to 8.

In the figures, similar reference characters generally refer to the same parts throughout the different views. The figures are not necessarily to scale, emphasis instead generally being placed upon illustrating the principles of the present invention. In the following description, various aspects of the present invention are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
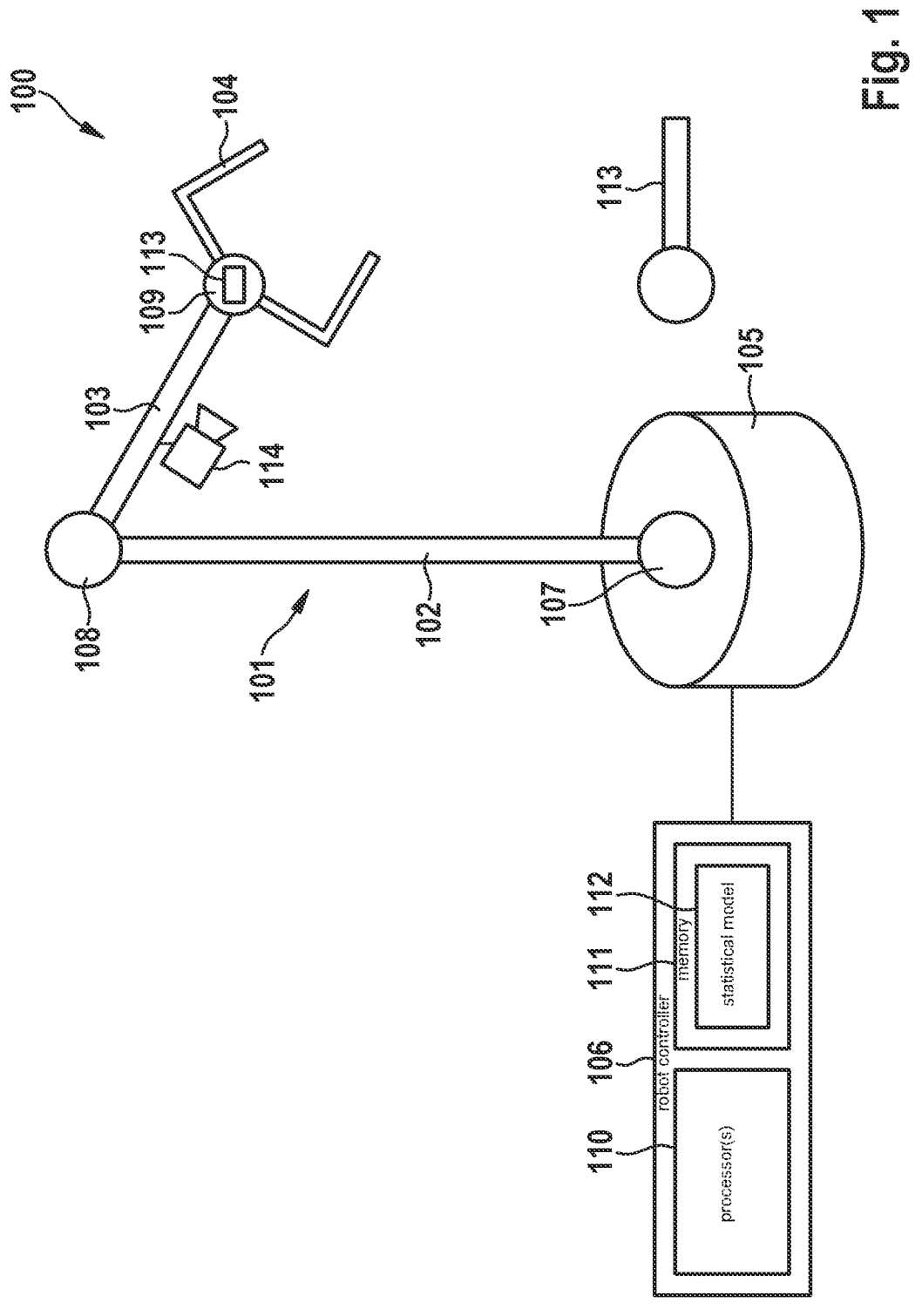
FIG. 1 shows a robot according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a statistical model 112 stored in the memory 111.

A robot 100 can take advantage of learning-from-demonstration (LfD) approaches to learn to execute a task or collaborate with a human partner. Human demonstrations can be encoded by a probabilistic model (also referred to as statistical model) that represents the nominal plan of the task for the robot. The controller 106 can subsequently use the statistical model, which is also referred to as robot trajectory model, to generate the desired robot movements, possibly as a function of the state of both the human partner and the environment.

The basic idea of LfD is to fit a prescribed skill model such as GMMs to a handful of demonstrations. Let there be M demonstrations, each of which contains $T_m$ data points for a dataset of $N = \Sigma_m T_m$ total observations $$\xi = \{\xi_t\}_{t=1}^N,$$

where $\xi_t \in \mathbb{R}^d$. Also, it is assumed that the same demonstrations are recorded from the perspective of P different coordinate systems (given by the task parameters such as local coordinate systems or frames of objects of interest). One common way to obtain such data is to transform the demonstrations from a static global frame to frame p by $$\xi_t^{(p)} = A^{(p)-1} \left( \xi_t - b^{(p)} \right).$$

Here, $$\{(b^{(p)}, A^{(p)})\}_{p=1}^{P}$$

is the translation and rotation of (local) frame p w.r.t. the world (i.e. global) frame. Then, a TP-GMM is described by the model parameters $$\left\{\pi_k, \{\mu_k^{(p)}, \Sigma_k^{(p)}\}_{p=1}^{P}\right\}_{k=1}^{K}$$

where K represents the number of Gaussian components in the mixture model, $\pi_k$ is the prior probability of each component, and $$\left\{\mu_k^{(p)}, \Sigma_k^{(p)}\right\}_{p=1}^{P}$$

are the parameters of the k-th Gaussian component within frame p.

Differently from standard GMM, the mixture model above cannot be learned independently for each frame. Indeed, the mixing coefficients $\pi_k$ are shared by all frames and the k-th component in frame p must map to the corresponding k-th component in the global frame. Expectation-Maximization (EM) is a well-established method to learn such models.

Once learned, the TP-GMM can be used during execution to reproduce a trajectory for the learned skill.

Hidden semi-Markov Models (HSMMs) extend standard hidden Markov Models (HMMs) by embedding temporal information of the underlying stochastic process. That is, while in HMM the underlying hidden process is assumed to be Markov, i.e., the probability of transitioning to the next state depends only on the current state, in HSMM the state process is assumed semi-Markov. This means that a transition to the next state depends on the current state as well as on the elapsed time since the state was entered. They can be applied, in combination with TP-GMMs, for robot skill encoding to learn spatio-temporal features of the demonstrations, resulting in a task-parameterized HSMM (TP-HSMM) model.

The application of such a robot control model requires an estimation of the pose of an object 113 to be handled. This may relate to an initial pose of the object 113 to be handled such that the parameters of the TP-GMM can be correctly set. However, poses may also need to be estimated for the observations. For example, the demonstrations are recorded by taking sequences of images and the observations correspond (or include) poses of a handled object (or parts of the robot) extracted from the images. According to various embodiments, approaches to estimate poses on selected feature points are provided which allow, during deployment, to first estimate the pose (e.g. 6D pose) of an object in a control scenario (scene) given, for example, an RGBD (RGB+depth) image. Then, this pose is fed into TP-HSMM to compute the desired trajectory for this control scenario. Before the training of TP-HSMM, a selection of these key feature points is performed. Then, for each demonstration, the 6D object pose may also be derived given this selection. During training of the TP-HSMM, these 6D poses are used to compute the task parameters in the object frame.

Thus, according to various embodiments, learning from demonstrations is combined with a pose estimation approach which is based on mapping an image to a descriptor image. An example of a model which may be trained to perform such a mapping is a dense object net.

A dense object net provides a way to track object specific features. It can be trained such that it is either object specific or object class specific. Therefore, it offers a way to detect object class specific features over a broad class of objects with one single neural network.

A dense object net (DON) represents a h×w×3 RGB-image in a h×w×D, $D \in \mathbb{N}^+$ descriptor space.

For training a DON, a loss-function based on pixelwise contrastive loss can be minimized on a fully-connected network. Pixelwise contrastive loss is a technique which generates a loss from two given images. According to this loss, every pair of semantic similar pixel in the two images should be mapped to a pair of similar points in descriptor space. Moreover, every pair of semantic dissimilar pixels should be mapped in distinct regions of the descriptor space. The application of pixelwise contrastive loss leads to a network which can detect object (class) specific features. According to various embodiments, this ability is exploited. In particular, an object specific feature point is detected (given as an element of the descriptor space; this element is denoted a feature point) in an unseen (in training data) image (showing a certain configuration, e.g. an initial configuration from which the robot arm 101 should be controlled). The Euclidean coordinates of a given descriptor (and thus of a given feature, e.g. of object 113) is found by finding the pixel of the image which is represented in descriptor space by a descriptor which is as close as possible to the given (target) descriptor. For finding this "best" pixel, denoted by (u*,v*), several approaches may be used. One approach is to choose the pixel which corresponds to a descriptor which minimizes the distance to the target descriptor:

$$(u^*,v^*) = \operatorname{argmax}_{(u,v) \in h \times w} \|d^* - I(u,v)\|^2 \qquad (1)$$

where d* denotes the feature descriptor and I the descriptor image.

As mentioned above, this is only an example and other approaches may be used for finding a match in a (new) image with a given descriptor. For example, for more robustness, a modified version called spatial expectation is used according to an embodiment where an expectation of a squared error weighted with an exponential is taken.

The transformation from image coordinates (pixel coordinates) to world coordinates (e.g. robot reference frame coordinates) is a standard technique in robotics and computer vision. Applying this transformation to the found "best" pixel results in a routine for finding the Euclidean coordinates for an object specific feature point which is given in descriptor space. These Euclidean coordinates are denoted as the Euclidean coordinates of the feature point. They depend on the scene (i.e. configuration).

It is now assumed that the output of a dense object net is available and for each descriptor in the descriptor image of a current image (e.g., showing an initial configuration for which the robot arm 101 is to be controlled) it is known whether it corresponds to a point on the target object (e.g. object 113) and if it does the Euclidean coordinates of the point on the object to which it belongs are also known. In the following, approaches are described allowing finding a pose estimation which is applicable for learning by demonstrations. The pose estimation should be invariant with respect to movements of the object in the sense that if the object is moved, the pose is also transformed in the same way. It should be noted that an RBG-image is not used for this. In particular, every data point in the training (or learning) dataset $\{I_i, \text{mask}_i, \text{transformation}_i\}$, i=1 . . . N, may consist of a D-dimensional descriptor image I, an image mask (it contains the information whether a point belongs to the object or not) and a way (denoted as "transformation") to calculate the Euclidean coordinates for each descriptor which represents a point which is lying on the object. It should be noted that this training dataset is the training dataset for selecting the feature points. The DON is assumed to be already trained or is trained before for the object with another suitable training dataset (in a supervised or unsupervised manner).

According to various embodiments, an approach allowing to find a pose estimation which is applicable for learning by demonstrations includes an optimization based method for finding K descriptors (called feature points), an (optionally) optimization based parameterization of a coordinate frame for subsets $X \subseteq \mathbb{R}^3$ and (optionally) an orthogonal projection onto a suitable hyperplane.

Choice of Descriptors

This includes finding features points which may then be used for parameterization of a coordinate frame.

According to various embodiments, a set of feature point is selected to satisfy various conditions. In the following, four conditions are given but it should be noted that not all of them need to be taken into account and they may be given weights to emphasize one over the other.

A first condition is that the selected feature points should be detected with a small detection error (this includes the visibility of the object-features which they encode). For quantifying this criterion, for each possible descriptor the matching error over all data points in the learning dataset is calculated and the error is calculated as an expectation for the matching error for an unknown data point (because the detection-error is normalized the cumulative error can be used instead of the mean-error).

There are two domains in which the matching error can be calculated: in descriptor-domain (distance between the descriptor and the descriptor image) and in Euclidean-domain (variation in the Euclidean coordinates of the feature point). The advantages of calculating the matching error in descriptor domain is that it does not require any ground-truth information about which pixels belongs (semantically) to which pixel in another image. Despite the availability of such a dataset (training dataset of the dense object net) it causes a loss of generality to use it. However, it can be observed that there exist objects such that there exist feature points which can be tracked very well in descriptor space but inadequately in Euclidean space so Euclidean domain may also be used.

A second condition for selecting the set of feature points that the set of feature points should satisfy is spatial variety in descriptor space. This condition ensures that the selected feature points describe different features, in view of the dense object net, of the object in Euclidean space. Similar to the spatial separation condition in descriptor space a third condition may be spatial separation in Euclidean space. If the feature points are too close to each other in Euclidean space (i.e. their Euclidean coordinates are too similar for an object), then the impact of matching errors increases. In contrast to the matching error in Euclidean space condition the spatial separation condition causes no loss of generality because it needs no knowledge about the relation of different images to each other.

A fourth condition is that features should be taken that are included in all data points of the learning data set (or as many as possible). Assuming that each descriptor image in the training data set is generated by the trained DON from a camera image, this means that all descriptors should be visible in all (or as many as possible) images of the training data set. Since it can be assumed that the demonstrations represented configurations which will also be present in deployment, it can be expected to be likely that object parts which have these feature points will then also be visible in images taken in deployment.

Equation (2) gives an optimization problem for selecting the feature points which takes into account the four conditions described above.

$$\min_{\substack{p_i \in \mathbb{R}^D \\ i=1,\dots,K}} \left[ -\alpha_1\left(NO_{(\mathbb{R}^D)}\kappa\beta_1\right)(p_1,\dots,p_D) - \alpha_2\left(NO_{(\mathbb{R}^D)}\kappa\beta_2\right)(p_1,\dots,p_D) + \right. \tag{2}$$

$$\left. \alpha_3\left(NO_{(\mathbb{R}^D)}\kappa\beta_3\right)(p_1,\dots,p_D) + \alpha_4\left(NO_{(\mathbb{R}^D)}\kappa\beta_3\right)(p_1,\dots,p_D) \right]$$

where $$\beta_1(p_1,\dots,p_K) = \sum_{\substack{j,k=1 \\ i \neq j}}^{K} \|p_j - p_k\|$$

$$\beta_2(p_1,\dots,p_K) = \sum_{\substack{j,k=1 \\ i \neq j}}^{K} \frac{1}{N}\sum_{l=1}^{N} \|\text{transformation}_l(p_j) - \text{transformation}_l(p_k)\|$$

$$\beta_3(p_1,\dots,p_K) = \frac{1}{4}\sum_{j=1}^{K} e(p_j)$$

$$\beta_4(p_1,\dots,p_K) = \sum_{i=k}^{K}\sum_{l=1}^{N} \text{detected}_l(p_k)$$

Here, K is the number of selected descriptors, $\alpha_1$, $\alpha_2$, $\alpha_3$, $\alpha_4$ are positive real numbers which serve as coupling parameters of the conditions. The normalization operator $NO_I$ is an operator which maps functions $f: I \subseteq X \to \mathbb{R}^+$ to functions $\tilde{f}$: $I \subseteq X \to [0,1]$ such that different $\tilde{f}$ restricted on I can be added up for defining a cost function (all $\tilde{f}$ have the same impact on it).

The function $\text{detected}_l(p_k)$ is a indicator function that equals to 0 if feature point $p_k$ is detected in image l and $\infty$ otherwise.

For any finite set I the normalization operator can be defined by $$NO_I f(x) = \frac{f(x) - \min_{\tilde{x} \in I} f(\tilde{x})}{\max_{\tilde{x} \in I} f(\tilde{x}) - \min_{\tilde{x} \in I} f(\tilde{x})} \tag{3}$$

In equation (3), the function e(.) maps a descriptor to the corresponding matching error in Euclidean space. If the training dataset for the dense object net is available (or any other dataset which consists of scenes where the object position and pose is static), then the following estimation process for e(x) can be used:

for each scene i choose (randomly) k images and infer the Euclidean coordinates $p_{ij}$ for x in each image. Within a scene compute the mean-value $$\bar{p}_i = \frac{1}{j}\sum_{l=1}^{k} p_{ij}. \text{ Then } e(x) \approx \sum_{i,j} p_{ij} - \bar{p}_i.$$

As mentioned above, the cumulative matching error is sufficient.

Parameterization of a Coordinate Frame

Given a set of feature points (e.g. learned as described above) a coordinate system (or frame) for a space X which depends on the learned feature points is derived (learned). Let D denote the matrix whose columns are the Euclidean coordinates of the learned feature points and B(D) the desired basis matrix (i.e. whose columns are a basis of X). In the following it is assumed (without loss of generality) that $X = \mathbb{R}^3$. Otherwise the learned descriptors are projected onto X and the following operations are performed all steps mutatis mutandis on X (identified as $\mathbb{R}^n$ for a suitable n). Furthermore, it is assumed that B(D)=DB for a matrix B with suitable dimension. The learned coordinate system should be reliable in the sense that noise in the Euclidean coordinates of the feature points should not have a significant influence on the basis-vectors. In mathematical terms, this can be formulated as a minimization of $$\|B(D) - B(\tilde{D})\| \tag{4}$$

where $\tilde{D}$ denotes the measured descriptor matrix. This means $\tilde{D}=D+E$ with a noise term E. This noise term can be written as $$E = (e_1 \ e_2 \ \dots \ e_K) \begin{pmatrix} w_1 & & & \\ & w_2 & & \\ & & \ddots & \\ & & & w_K \end{pmatrix} \tag{5}$$

for some $w_i \in \mathbb{R}$ i=1, 2, . . . , K, $e_i \in \mathbb{R}^3$ i=1, 2, . . . , K with $\|(e_1 \ e_2 \ \dots \ e_K)\| \leq 1$.

Thus, $$\|B(D) - B(\tilde{D})\| = \left\| (e_1 \ e_2 \ \dots \ e_k) \begin{pmatrix} w_1 & & & \\ & w_2 & & \\ & & \ddots & \\ & & & w_K \end{pmatrix} B \right\| \leq \left\| \begin{pmatrix} w_1 & & & \\ & w_2 & & \\ & & \ddots & \\ & & & w_K \end{pmatrix} B \right\| = \|WB\|$$

It should be noted that $\|WB\|$ is the maximum singular value of WB.

The weights $w_i$, i=1, 2, . . . , K may be estimated using the cumulative matching error described above.

For simplicity the optimization of (4) may be made over all B's which define a coordinate system whose axis are either the vectors between two points or the vectors pointing from one central point to the other points. An orthogonalisation process can be applied on B(D) to obtain an orthogonal basis.

The mean-value of the Euclidean coordinates of the feature points can be used as an origin.

Supporting Hyperplane

If an object in the training is "real" 3D, the approach described above for a selection of feature points and learning of a coordinate frame is applicable on the object. However, in many industrial applications the considered objects are not real 3D in the sense that there exist directions in which the object provides less variety. In such a case the approach described above leads to, at least one, unreliable coordinate axis. Therefore, in case of such an object (e.g. a flat object), this direction is removed with help of an orthogonal projection onto a suitable selected hyperplane.

Figure 2:
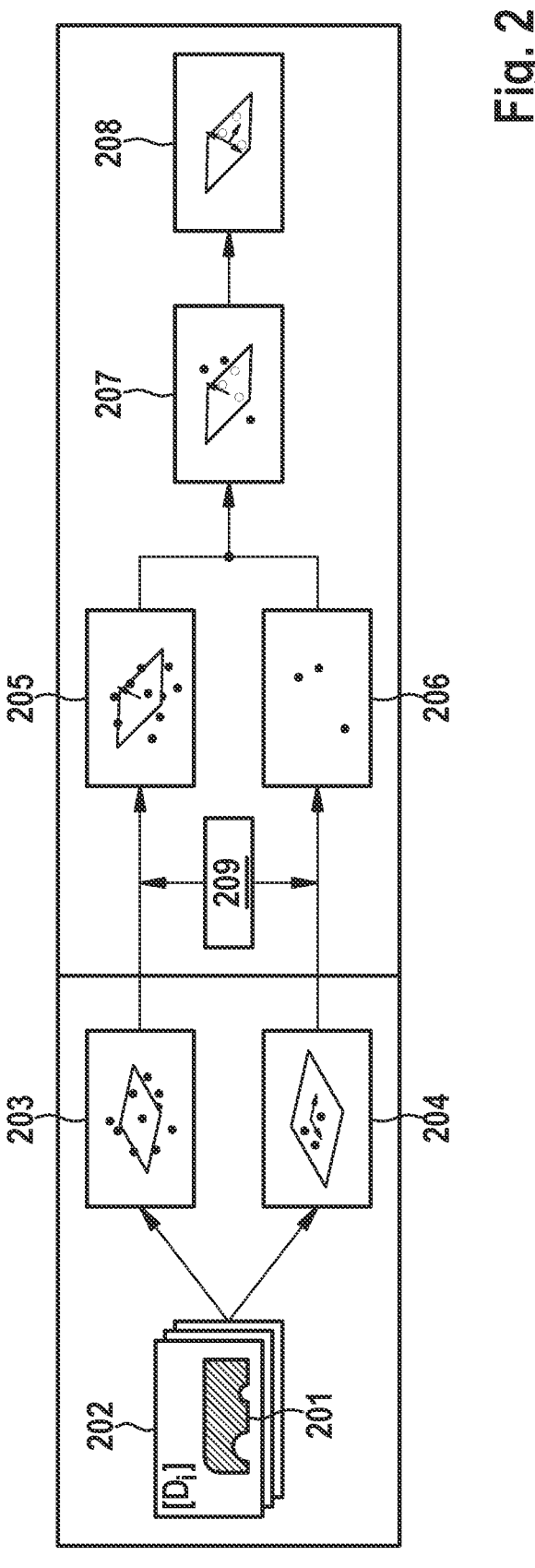
FIG. 2 illustrates a method for selection of feature points and learning of a coordinate frame for an object in the training dataset which have little variety in one direction and application of the coordinate frame in deployment, according to an example embodiment of the present invention.

FIG. 2 illustrates a method for selection of feature points and learning of a coordinate frame 204 for an object 201 in the training dataset 202 which have little variety in one direction and application of the coordinate frame in deployment.

The method includes selection of (learning) a hyperplane 203. The hyperplane should approximate the surface on which the points corresponding to (matched) descriptors of the object (referred to as the object's point cloud) are lying. If the surface is almost flat, then a standard least squares or singular value decomposition approach can be used. However, this is not always the case. For example, a classical PCB (printed circuit board) object has one direction in which it has small variety (the direction perpendicular to the board) and approaches such as least squares or singular value decomposition may fail due to the size of the electronic components and the matching error of the dense object net.

To overcome this issue, according to various embodiments, a modified (or adapted) Theil-Sen estimator for calculating the supporting plane 203 is used.

Every plane is uniquely defined by two direction vectors and one supporting point. Moreover, a hyperplane can be interpreted as a graph of a function $f: \mathbb{R}^2 \to \mathbb{R}$. The slope of f may be estimated on the two standard Euclidean axes of $\mathbb{R}^2$.

A point y given in the image of f it can be written as $$y = c_1 + c_2 = \alpha_1 \cdot m_1 \cdot e_1 + \alpha_2 \cdot m_2 \cdot e_2$$

with $e_1$; $e_2$ the standard Euclidean axes unit vectors, $m_1$; $m_2$ the slopes of f in the $e_1/e_2$ direction and $\alpha_1$, $\alpha_2$ some scalars such that $y = f(\alpha_1 e_1 + \alpha_2 e_2)$.

The ratio $m_1/m_2$ may be calculated from y and $c_2/c_1$. For learning (i.e. fitting) a hyperplane both slopes have to be determined at the same time. Therefore, an iterative algorithm alternating between determining of $m_1/m_2$ and estimation of $c_1$, $c_2$ is used according to an embodiment. Algorithm 1 below gives an example which operates on a point cloud P (wherein each point has three spatial coordinates).

```
Input: P = {p₁, p₂, p₃} = {{p₁,ᵢ}, {p₂,ᵢ}, {p₃,ᵢ}}
Output: n and b
/* initial guess:        */
1   m₁, m₂ = 1;
2   for choice of x₁, x₂ and y in P do
3   |    while deviation of m₁, m₂ and the previous ones
    |      are too big AND maximal number of iteration is
    |      not reached do
4   |    |    c₁ = y − m₂ · x₂;
5   |    |    c₂ = y − m₁ · x₁;
6   |    |    Use Theil-Sen to calculate a new estimation
    |    |      of m₁, m₂ and both interceptions for the
    |    |__    data (x₁, c₁) and (x₂, c₂);
7   |    calculate fitting error and store it with the
    |__      hyperplane-parameters;
8   Choose fit with lowest fitting error;
```

Algorithm 1: Adapted Theil-Sen Estimator for Hyperplane Fitting

The hyperplane 203 can be estimated from any one of the data points (i.e. any of the descriptor images with associated transformation to generate the corresponding point cloud) of the training data set.

Given the hyperplane 203, the Euclidean coordinates of the feature points can be projected onto it. For applying the method to parameterize a coordinate frame described above the hyperplane 203 (which can be identified with $\mathbb{R}^2$) is equipped with a coordinate system. A possible way is to move the world coordinate system such that the origin is lying in the mean of all Euclidean coordinates of the descriptors and the transformed z-axis is aligned with the normal vector of the hyperplane). This transformed world coordinate system induces a planar coordinate system on the hyperplane (projection of the x- and y-axis on the hyperplane) in which the parameterization can be performed. Furthermore, the calculated transformation allows extending the parameterized planar basis (it can be interpreted as a generalized rotation about the z-axis/normal vector) to a basis of $\mathbb{R}^3$. This approach also works for other methods of finding a planar basis. In particular, any method which is based on the comparison of point clouds can be used.

So, in the training, from the object 201, a point cloud of (Euclidean space) points corresponding to descriptors which correspond to locations on the objects 201 is generated. For each descriptor image, the Euclidean coordinates of the descriptors are determined by the respective transformation for the descriptor image.

If the object is not real 3D, a supporting hyperplane 203 of the object is determined as described above. A possible way to determine whether a hyperplane (and a projection on the hyperplane) is needed is provided by the singular values of the point cloud interpreted as a matrix. This decision can be done automatically.

For each point of the point cloud compute the Euclidean distance between its Euclidean coordinates and the hyperplane. Select the points which have the smallest Euclidean distance to the hyperplane and remove the others to remove outliers from the point cloud.

Then, the approach described above is used to determine a planar coordinate frame 204 (i.e. a coordinate frame for the hyperplane) which depends on Euclidean coordinates of a selected set of feature points. When the object is not real 3D these Euclidean coordinates of the selected set of feature points are the Euclidean coordinates projected to the hyperplane. Accordingly, if the feature points are selected taking into account a condition with respect to Euclidean coordinates of feature points and the object is not real 3D, this condition is applied to the Euclidean coordinates projected to the hyperplane.

In deployment (i.e. online inference), having a point cloud from observations 209 (e.g. a current image of an object 113 in a control scenario unseen in training), if the object is not real 3D, a hyperplane 205 for the point cloud and the positions 206 of the 3D points corresponding to the selected feature points are determined (by matching of the selected feature points with the descriptors of the current image). This means that given a descriptor image (generated by the DON for the image of the object 113) and the camera intrinsic and extrinsic parameters the Euclidean coordinates of the point cloud and in particular of the selected feature points (up to a possible matching error) can be determined. The hyperplane 204 can be determined (i.e. matched to the point cloud) as in training with the approach described above.

The Euclidean coordinates of the selected features points (i.e. the points defining the planar frame 204) are projected onto the hyperplane in 207 to give the planar coordinate frame given by these projections.

The overall (3D) coordinate frame 208 is the combination of the mean-value of the Euclidean coordinates of the point cloud, the planar coordinate frame and the transformed world coordinate system as described above. In the case there is no projection needed (i.e. in case of a real 3D object), the overall coordinate frame 208 is just the one given by the positions of the selected feature points (found by feature matching between the feature points and the descriptor images of the current image).

The optimization-based selection of features points according to equation (2) may for example be solved by the following heuristic approach. Given a dataset, select one data point and infer a set of descriptors which are lying on the object. Replace/approximate all descriptors in this set which are closer than a given threshold to each other with the coordinate-wise mean of the original descriptors. In a second step calculate the matching error of all descriptors in the compressed set over all data points in the training dataset. Remove descriptors which have a matching error bigger than a given threshold for one data point. Select a subset of descriptors which have the lowest cumulative matching error (for each descriptor separately) in the set. For each possible combination of K descriptors in the subset evaluate the cost used in the optimization problem of equation (2). It should be noted that equation (3) is applicable because the cost is evaluated on finite many points. Reject all feature point pairs in which a pair of feature points exists which has a Euclidean distance smaller than a given threshold (in descriptor space or in Euclidean space). Use the descriptor pair with the smallest overall cost.

Figure 3:
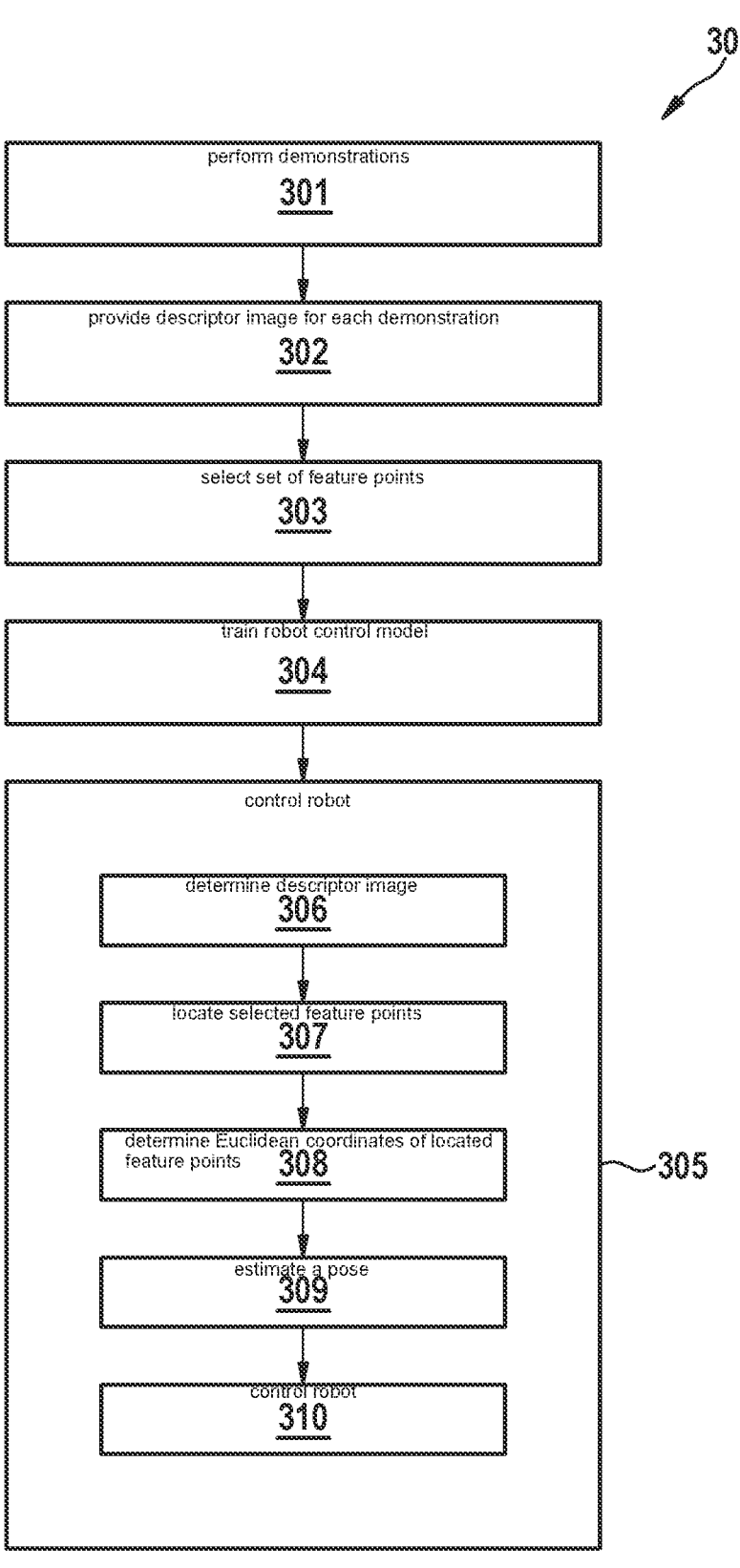
FIG. 3 shows a flow diagram illustrating a method for controlling a robot, according to an example embodiment of the present invention.

In summary, according to various embodiments, a method is provided as illustrated in FIG. 3.

FIG. 3 shows a flow diagram 300 illustrating a method for controlling a robot.

In 301, demonstrations are performed (e.g. by a human user, wherein each demonstration demonstrates a handling of an object.

In 302, for each demonstration, at least one descriptor image from a point of view of the robot of the object is provided (or obtained), wherein the descriptor image specifies feature points for locations on the object. The descriptor images may for example be generated by a DON from images taken by a camera mounted on the robot during the demonstrations.

In 303, a set of feature points is (automatically) selected from the specified feature points, wherein the feature points are selected by searching an optimum of an objective function which rewards selected feature points being visible in the descriptor images.

In 304, a robot control model (i.e. a TP-HSMM) is trained using the demonstrations, wherein the robot control model is configured to output control information depending on an input object pose.

In 305, a robot is controlled for a control scene with the object by determining a descriptor image of the object from the point of view of the robot in 306, locating the selected set of feature points in the descriptor image of the object in 307, determining Euclidean coordinates of the located feature points for the control scene in 308, estimating a pose from the determined Euclidean coordinates in 309 and controlling the robot to handle the object by means of the robot control model, wherein the estimated pose is supplied to the robot control model as input in 310.

The approach of FIG. 3 can be used to compute a control signal for controlling a physical system, like e.g. a computer-controlled machine, like a robot, a vehicle, a domestic appliance, a power tool, a manufacturing machine, a personal assistant or an access control system. According to various embodiments, a policy for controlling the physical system may be learnt and then the physical system may be operated accordingly.

Various embodiments may receive and use image data (i.e. digital images) from various visual sensors (cameras) such as video, radar, LiDAR, ultrasonic, thermal imaging, motion, sonar etc., for example as a basis for the descriptor images.

According to one embodiment, the method is computer-implemented.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for controlling a robot, comprising:

Performing demonstrations, whereineach demonstration of the demonstrations demonstrates a handling of an object;

Providing, for each demonstration, at least one descriptor image of the object from a point of view of the robot, wherein the descriptor image specifies feature points for locations on the object;

Selecting a set of feature points from the specified feature points, wherein the feature points are selected by searching an optimum of an objective function which rewards selected feature points being visible in the descriptor images;

Training a robot control modelusing the demonstrations, wherein the robot control model is configured to output control information depending on an input object pose; and Controlling the robot for a control scene with the object by:

Determining a descriptor image of the object from the point of view of the robot;

Locating the selected set of feature points in the descriptor image of the object;

Determining Euclidean coordinates of the located feature points for the control scene;

Estimating a pose from the determined Euclidean coordinates; and

Controlling the robot to handle the object using the robot control model, wherein the estimated pose is supplied to the robot control model as input.

2. The method of claim 1, wherein the objective function further rewards one or more of the selected feature points being spaced apart in descriptor space, locations on the object corresponding to the selected feature points being spaced apart in Euclidean space, and a detection error for the selected feature points for the object being low.

3. The method of claim 1, further comprising:

Matching a plane to the object;

Selecting the feature points such that they define a coordinate frame on the plane; and Estimating the pose from the determined Euclidean coordinates of the located feature points and information about a pose of the matched plane.

4. The method of claim 3, wherein estimating the pose from the determined Euclidean coordinates includes projecting the Euclidean coordinates of the located feature points to the matched plane.

5. The method of claim 3, wherein the feature points are selected such that they define a coordinate frame on the plane and the pose is estimated from the determined Euclidean coordinates of the located feature points and information about the pose of the plane when a variation of the object in a spatial direction is below a predetermined threshold.

6. The method of claim 1, further comprising:

Determininga derivation rule of a coordinate frame from Euclidean coordinates of the selected feature points;

Wherein estimating the pose from the determined Euclidean coordinates includes application of the derivation rule to the selected feature points, wherein the derivation rule is determined by searching a minimum of a dependency of the coordinate frame from noise in the Euclidean coordinates.

7. The method of claim 1, wherein the training of the robot control model using the demonstrations includes, for each demonstration, locating the selected set of feature points in the descriptor image of the object, determining Euclidean coordinates of the located feature points for the demonstration, and estimating a pose from the determined Euclidean coordinates for the demonstration.

8. The method of claim 1, further comprising determining the descriptor image of the object from a camera image of the object by a dense object net.

9. The method of claim 1, wherein the estimated pose is invariant with respect to a movement of the object such that when the object is moved the estimated pose is transformed in the same way.

10. A robot controller, configured to control a robot, the robot controller configured to:

Perform demonstrations, wherein each demonstration of the demonstrations demonstrates a handling of an object;

Provide, for each demonstration, at least one descriptor image of the object from a point of view of the robot, wherein the descriptor image specifies feature points for locations on the object;

Select a set of feature points from the specified feature points, wherein the feature points are selected by searching an optimum of an objective function which rewards selected feature points being visible in the descriptor images;

Train a robot control model using the demonstrations, wherein the robot control model is configured to output control information depending on an input object pose; and Control the robot for a control scene with the object by:

Determining a descriptor image of the object from the point of view of the robot;

Locating the selected set of feature points in the descriptor image of the object;

Determining Euclidean coordinates of the located feature points for the control scene;

Estimating a pose from the determined Euclidean coordinates; and

Controlling the robot to handle the object using the robot control model, wherein the estimated pose is supplied to the robot control model as input.

11. The robot controller of claim 10, wherein the estimated pose is invariant with respect to a movement of the object such that when the object is moved the estimated pose is transformed in the same way.

12. A non-transitory computer-readable medium on which is stored a computer program for controlling a robot, the control program, when executed by a computer, causing the computer to perform:

Performing demonstrations, wherein each demonstration of the demonstrations demonstrates a handling of an object;

Providing, for each demonstration, at least one descriptor image of the object from a point of view of the robot, wherein the descriptor image specifies feature points for locations on the object;

Selecting a set of feature points from the specified feature points, wherein the feature points are selected by searching an optimum of an objective function which rewards selected feature points being visible in the descriptor images;

Training a robot control modelusing the demonstrations, wherein the robot control model is configured to output control information depending on an input object pose; and Controlling the robot for a control scene with the object by:

Determining a descriptor image of the object from the point of view of the robot;

Locating the selected set of feature points in the descriptor image of the object;

Determining Euclidean coordinates of the located feature points for the control scene;

Estimating a pose from the determined Euclidean coordinates; and

Controlling the robot to handle the object using the robot control model, wherein the estimated pose is supplied to the robot control model as input.

13. The non-transitory computer-readable medium of claim 12, wherein the estimated pose is invariant with respect to a movement of the object such that when the object is moved the estimated pose is transformed in the same way.

* * * * *